United States Patent
Causey, Jr.

(10) Patent No.: US 6,969,085 B2
(45) Date of Patent: Nov. 29, 2005

(54) SAFETY HOLD DOWN DEVICE AND HITCH GUIDE FOR TRAILER DECOUPLING PREVENTION

(75) Inventor: James G. Causey, Jr., 4612 Carum Cir., Lake Park, GA (US) 31636

(73) Assignee: James G. Causey, Jr., Lake Park, GA (US)

( * ) Notice: Subject to any disclaimer, the term of this patent is extended or adjusted under 35 U.S.C. 154(b) by 79 days.

(21) Appl. No.: 10/782,081

(22) Filed: Feb. 19, 2004

(65) Prior Publication Data

US 2004/0201201 A1 Oct. 14, 2004

Related U.S. Application Data

(60) Provisional application No. 60/461,081, filed on Apr. 8, 2003.

(51) Int. Cl.[7] .............................................. B60D 1/28
(52) U.S. Cl. ................... 280/507; 280/504; 280/432
(58) Field of Search .............................. 280/432, 504, 280/507, 511

(56) References Cited

U.S. PATENT DOCUMENTS

| | | | | |
|---|---|---|---|---|
| 3,730,558 A | * | 5/1973 | Litzenberg | 280/511 |
| 4,032,171 A | * | 6/1977 | Allen et al. | 280/507 |
| 4,141,569 A | * | 2/1979 | Dilk | 280/507 |
| 4,291,893 A | * | 9/1981 | Hansen | 280/507 |
| 4,459,832 A | * | 7/1984 | Avrea et al. | 70/14 |
| 5,087,064 A | * | 2/1992 | Guhlin | 280/507 |
| 6,802,523 B1 | * | 10/2004 | Profitt | 280/507 |

* cited by examiner

Primary Examiner—Lesley D. Morris
Assistant Examiner—L. Lum
(74) Attorney, Agent, or Firm—Donald W. Meeker

(57) ABSTRACT

A trailer hitch having a tubular column between a hitch ball and a towing vehicle. A mating shaft with a horizontal retaining plate has a mating shaft fitting removably within the tubular column. A pin through mating openings in the shaft and tubular column maintain the retaining plate above a trailer arm socket mounted on the hitch ball. A guide with a pair of tapered vertical walls forming a horizontal V-shape has a mating shaft which fits alternately in the tubular column to guide a trailer arm into engagement with the hitch ball.

10 Claims, 4 Drawing Sheets

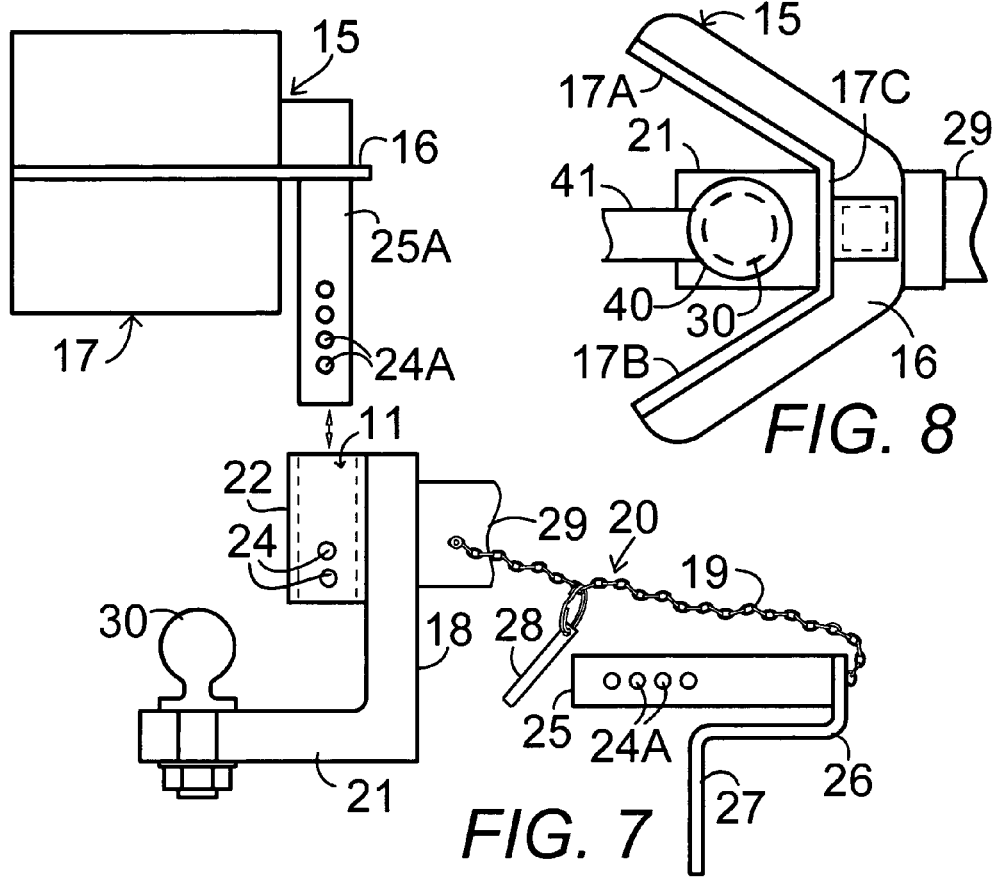
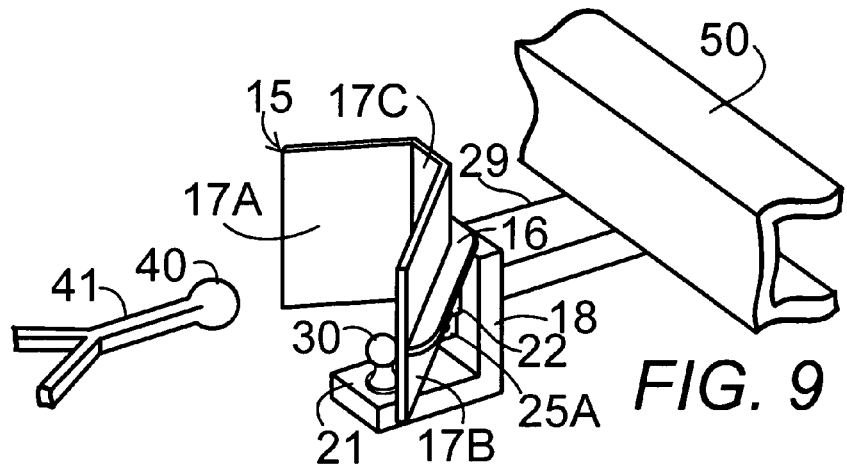

SAFETY HOLD DOWN DEVICE AND HITCH GUIDE FOR TRAILER DECOUPLING PREVENTION

CLAIM OF PROVISIONAL APPLICATION RIGHTS

This application claims the benefit of U.S. Provisional Patent Application No. 60/461,081, filed on Apr. 8, 2003.

BACKGROUND OF THE INVENTION

1. Field of the Invention

The present invention relates to ball and socket type trailer hitches and particularly to a safety device for preventing the decoupling of the ball and socket members that comprises a socket hold down bracket, which is slidably mounted within a steel tubular column and secured by a pin through mating openings in the bracket and column and a similarly mounted hitch guide alternately slidably mounted within the steel tubular column for guiding the socket to align with the ball for interconnection.

2. Description of the Prior Art

Trailers are commonly used for towing any of a number of objects including boats, snowmobiles, recreational vehicles, and the like. Trailers are conventionally coupled to a towing vehicle via a tongue and hitch interface. In general, forward extending frame rails of a trailer include a tongue fixedly attached thereto. Traditional tongues include a ball socket that interfaces with a ball of the hitch for providing a primary connection therebetween. The ball and socket interface enables a degree of independent movement of the trailer, relative to the vehicle, for turning or other movement of the trailer relative to the vehicle.

If the ball is smaller than the socket there is a high probability that the socket will slip off the ball. A bad coupler between the ball and socket may also result in separation of the ball and socket. Even with a proper fit, traveling over rough roads or off road or making sharp turns or traveling on sloping surfaces with the trailer and towing vehicle at different angles from one another subject the connection to great strains which may result in the socket becoming disconnected from the ball and causing damage to the trailer and anything on the trailer.

A secondary, or safety, connection is also traditionally provided by at least one chain, but preferably a pair of chains. One end of each chain is anchored to the trailer and the free ends are attached to a vehicle structure, such as a hitch portion, via a hook or some other selective attachment device. Such chain attachments, however, retain particular disadvantages. These disadvantages stem from the fact that the chains dangle between the trailer and vehicle. One disadvantage is the noise generated by the free-dangling chains contacting either the tow vehicle or the trailer. A second disadvantage is that this contact may result in damage to either the trailer or tow vehicle. A third disadvantage is that the free-dangling chains may drag on the road surface during towing, thereby damaging the chains and compromising their safety function. A final disadvantage of such free-dangling chain interconnections is the potential for the chain connection with the vehicle to become undone as a result of excessive free motion of the chain during travel.

Furthermore, there is always the initial problem of interconnecting the socket on the trailer arm with the ball attached to the towing vehicle. Often the trailer is intrinsically heavy, as in the case of a camper trailer, or loaded with a heavy boat or other vehicle making the movement of the trailer to the towing vehicle difficult or impossible, especially for a single individual. So usually the towing vehicle is backed up to align and mate the ball on the vehicle with the socket on the trailer, a task which is very difficult since the socket and ball are not visible to the driver.

Prior art devices have not adequately addressed the problem of providing a very sturdy means of securing the ball in the socket which is easy to use and combining that securing means in a system which also provides a sturdy and easy to use guide for aligning the ball and socket for interconnection.

U.S. Pat. No. 3,522,958, issued Aug. 4, 1970 to Lusignan, provides a guard for a trailer hitch. The device comprises a vertically disposed rectangular member that is secured to the vehicle portion of a ball type trailer hitch by means of a rectangular locking bar that is firmly held in place by means of two spaced and fixed screws having lock washers and nuts thereon. An L-shaped member, having a plurality of spaced openings in the vertically disposed leg thereof, is placed with its vertically disposed leg up against the rearward face of the aforesaid rectangular member which is provided with a horizontally disposed pin and a horizontally disposed stud that will project through two of the openings in the vertically disposed leg of the L-shaped member. A wing nut that is placed on the stud will lock the two just described parts of the invention together after the two parts of the trailer hitch have been connected together. The horizontally disposed leg of the aforesaid L-shaped member rests on top of the trailer portion of the hitch, thus preventing the two parts of the trailer hitch from becoming accidentally separated.

U.S. Pat. No. 5,087,064, issued Feb. 11, 1992 to Guhlin, shows an anti-theft, safety device for use with ball and socket trailer hitches. The device comprises a base plate clamped to the tow bar near the ball, a post attached at one end to the base plate that extends vertically from the tow bar adjacent to the ball and socket, an upper plate through which the post extends that moves vertically and rotates with respect to the post, a bushing with an opening in register with the opening in the upper plate through which the post extends, both the post and the bushing having transverse openings through which a lock bolt may be passed when the holes are aligned so that the upper plate will be held over the socket to prevent the socket from being disconnected from the ball.

U.S. Pat. No. 3,479,057, issued Nov. 18, 1969 to Miller, concerns a trailer hitch safety device. A signal device is provided for use with an automobile and trailer hitch assembly having a ball member and a socket member, in which a signal switch is supported above the socket member of the assembly, normally in a spaced relation thereto, so that in the event the socket member becomes loosened from the ball member the switch will be closed by partial disengagement of the socket member from the ball member. The switch is mounted on a support having sufficient rigidity to prevent the socket member from becoming accidentally disengaged from the ball member.

U.S. Pat. No. 3,730,558, issued May 1, 1973 to Litzenberger, puts forth a trailer hitch safety device for preventing the inadvertent disengagement of the socket from the ball in a ball and socket type trailer hitch. The safety device has an upright standard affixed to the hitch with a stop mounted on the standard for pivotable movement to a position directly over the ball and socket to prevent their disengagement. The standard and stop have vertical surfaces that are aligned with each other when the stop extends directly over the socket. A vertically oriented lever is pivotally mounted on the stop for engaging the vertical surfaces to prevent the stop from being pivoted.

U.S. Pat. No. 4,208,065, issued Jun. 17, 1980 to Hansen, describes a coupling guard comprising a base that is secured to a mounting member extending from a towing vehicle and having an upstanding ball element. A retention member carried by the base is selectively movable to a position over a socket element which extends from a towed vehicle and which is detachably engaged downwardly over the ball element. The retention member limits the upward travel of the socket element and maintains engagement of the coupling. The retention member is held in position by lock means. A resilient member is disposed between the base and the retention member to prevent the retention member from rattling against the base.

U.S. Pat. No. 4,291,893, issued Sep. 29, 1981 to Hansen, indicates coupling guard, in which base is secured to a mounting member extending from a towing vehicle and has an upstanding ball element. A retention member carried by the base is selectively movable to a position over a socket element which extends from a towed vehicle and which is detachably engaged downwardly over the ball element. The retention member limits the upward travel of the socket element and maintains engagement of the coupling. The retention member is held in position by lock means. A resilient member is disposed between the base and the retention member to prevent the retention member from rattling against the base.

U.S. Pat. No. 6,406,052, issued Jun. 18, 2002 to Bale, indicates a secure trailer hitching post, which comprises: a) a body having an open top and a front opening and being adapted to be secured to a surrounding structure; b) a hitch ball assembly comprising a hitch ball plate positioned within and secured to the body and dividing the interior thereof into upper and lower portions, and a hitch ball; and c) a retainer assembly comprising a flat retainer plate and an apertured vertically depending tab received within a slot in the lower portion of the interior of the body. A sliding retaining shaft is positioned within apertures in the front of the body and the front of the slot, so that the retaining shaft may slide inward into the slot and through an aperture of the tab of the retainer assembly, thereby securing the tab within the slot and thereby securing the retainer assembly to the body. A coupler of a trailer is placed on the hitch ball and the retainer assembly placed within the top of the body with the tab received within the slot. The retaining shaft slides into the slot and through an aperture of the tab, and a locking mechanism engaged to prevent the retaining shaft from sliding out of the aperture, thereby securing the coupler of the trailer to the trailer hitching post and preventing unauthorized removal therefrom. The body may further comprise a horizontal channel bracket for receiving the lower edge of a garage door when the hitching post is placed on the ground and the garage door is closed.

U.S. Pat. No. 4,459,832, issued Jul. 17, 1984 to Avrea, describes a trailer hitch lock that comprises a pivotally mounted coupling guard, extending over a ball engaging socket of a trailer hitch to preclude disengagement of the socket from the ball, which is locked in place to deter unauthorized disengagement of the socket from the ball and theft of the attached trailer. A lock module penetrably receives and locks therein essentially all of the extending ends of both the pivot pin and the retaining pin of the coupling guard to preclude unauthorized pivotal movement of the coupling guard.

U.S. Pat. No. 5,873,271, issued Feb. 23, 1999 to Smith, puts forth a locking security device for a trailer and hitch of the ball and socket type, comprising an upper jaw and a lower jaw interconnected together by a shaft for reciprocal movement relative to each other. A locking mechanism keeps the two jaws apart at fixed distances over a ribbed portion of the shaft. In use, the two jaws are locked about the socket portion of the hitch to prevent unauthorized removal of the trailer. When the trailer is attached to a tow vehicle, the tow ball nut is received in an opening in the lower jaw. When the trailer is unattached, a dummy ball extends into the socket of the hitch. In both positions, the socket portion of the hitch is received in an aperture in the upper jaw.

U.S. Pat. No. 6,062,583, issued May 16, 2000 to Lauricella, Jr., concerns a novel hitch lock device, which can be removably mounted to vehicular ball type towing hitch arrangements for removably locking a common vehicular pivot ball type coupler to a ball hitch, while enabling hitch function in a plurality of angles and planer orientations.

U.S. Pat. No. 5,700,024, issued Dec. 23, 1997 to Upchurch, illustrates a coupler locking device, which can be affixed to the coupler mechanism of a trailer thereby preventing the accidental or unauthorized uncoupling of the coupler mechanism and which is useful both when the trailer is coupled to a towing vehicle and when the trailer is not coupled to a towing vehicle. Essentially the coupler locking device comprises a bracket which, when properly engaged with a joining member by a locking device, prevents separation of the hitch ball and the socket of the coupler mechanism as well as removal of the hitch ball from the towing vehicle, when so affixed. The method of using a coupler locking device having a bracket, joining member and a locking device.

U.S. Pat. No. 5,584,495, issued Dec. 17, 1996 to Mason, is for a trailer hitch locking assembly, which comprises an assembly for locking a trailer hitch to a trailer ball. The device includes a mounting plate securable between a hitch ball and a vehicle hitch. A trailer tongue securing assembly is pivotally mounted to the mounting plate and can be pivoted over the hitch ball to capture a trailer tongue therebetween. A ball securing assembly is pivotally mounted to the mounting plate and can be positioned over a mounting shank of the ball to preclude removal of the ball. A lock assembly extends between the ball securing assembly and the trailer tongue securing assembly to preclude unauthorized or unintentional decoupling of the hitch.

U.S. Pat. No. 5,433,467, issued Jul. 18, 1995 to Easterwood, provides a trailer tongue hitch and ball clamp assembly includes a base portion loosely surrounding the hitch ball shank between its sphere and a tow bar transversely of the depending surface of the trailer hitch coupling socket forming member. A bridge portion of the clamp assembly, secured to the base portion, transversely overlies the upper surface of the hitch coupling for impinging it against the base member in surrounding relation with respect to the hitch ball sphere which permits the clamp assembly to move as a unit with the trailer tongue socket forming member in its horizontal and vertical pivoting movement relative to the hitch ball.

U.S. Pat. No. 4,836,570, issued Jun. 6, 1989 to Lopez, claims an apparatus for preventing unauthorized intentional or accidental uncoupling of a trailer from a towed vehicle. A tow ball characterized by a flared shoulder is mounted on a tow bar. A bushing spaces the shoulder away from the tow bar and provides a cylindrical support for a bracket. The bracket is free to rotate about the bushing. A cap attached to the bracket prevents disengagement of the trailer from the towing vehicle.

U.S. Pat. No. 6,666,051, issued Dec. 23, 2003 to Li, shows a guarding lock for a camping trailer and particularly an anti-theft guarding lock for a camping trailer to prevent the trailer from being stolen and hauled away illegitimately, which mainly includes a lock having a semi-spherical dome located thereon. A U-shaped lock bar is provided to couple with the lock for fastening to a connection socket of the trailer such that the semi-spherical dome is housed in and coupled with a semi-spherical trough formed in the connection socket to achieve anti-theft function for the trailer.

U.S. Pat. No. 6,637,765, issued Oct. 28, 2003 to Barton, claims a towing safety device for securing a trailer hitch of a trailer in a coupled configuration with a hitch ball of a towing vehicle. In one embodiment, the towing safety device includes a base plate for attachment to the towing vehicle, at least one arm mount socket provided on the base plate and a lock arm having at least one pivot pin inserted in the arm mount socket, respectively. The lock arm can be pivoted between a lock position in which the lock arm engages the trailer hitch and prevents inadvertent uncoupling of the trailer hitch from the hitch ball, and an unlock position in which the lock arm disengages the trailer hitch to facilitate coupling and uncoupling of the trailer hitch and the hitch ball. In another embodiment, the towing safety device includes a lock bracket for extension over the trailer hitch, which lock bracket is provided with multiple shackle openings. A shackle is extended through the shackle openings and engages the lower curvature of the hitch ball such that the trailer hitch and the hitch ball are interposed between the lock bracket and the shackle.

U.S. Pat. No. 6,412,314, issued Jul. 2, 2002 to Jenks, discloses a trailer hitch module for engaging a trailer tongue socket includes a base and a ball fixed to the base for engaging a socket cup. A locking arm is provided and pivotally attached to the base so that it is movable in a plane parallel to the base between a close position engaging a protruding lip of the socket in order to prevent removal of the socket from the ball and an open position away from the lip in order to enable removal of socket from the ball. A lock mechanism is provided for securing the locking arm in the closed position.

U.S. Pat. No. D436,064, issued Jan. 9, 2001 to Niswanger, discloses the ornamental design for a universal trailer lock.

U.S. Patent Application #20030205884, published Nov. 6, 2003 by Koy, discloses a coupler locking device and method. The device for closing the socket of a trailer hitch, generally called a coupler lock, comprises a locking bar and a base having a plug member, a locking bar-receiving aperture, and an integral locking means for lockingly engaging the locking bar within aperture. When the coupler lock is attached to a trailer coupler, the trailer hitch socket is not accessible without removing the coupler lock with the appropriate key. Thus, theft of an unattended trailer is deterred due to the difficulty in attempting to remove the locking device. Providing a coupler lock having an integral locking mechanism better deters the tampering with or removal of the locking mechanism to remove the coupler lock from the trailer hitch as is possible in the art.

U.S. Patent Application #20020145268, published Oct. 10, 2002 by Zechbauer, describes a trailer hitch guide assembly that effectively elevates and guides a forward end of a trailer hitch into coupling engagement with a vehicle hitch. The trailer hitch guide assembly of the invention elevates the forward end of the trailer hitch and guides the forward end of the trailer hitch into alignment with a coupling of the vehicle hitch. When the trailer hitch engages a support arm of the guide assembly, the trailer hitch is lowered, wherein a coupling of the trailer hitch couples to the coupling of the vehicle hitch. The guide assembly of the invention may be attached and interchanged between a vehicle hitch having a ball mount with a rise above the receiver and a vehicle hitch having a ball mount with a drop below the receiver.

What is needed is a very sturdy means of securing the ball within the trailer socket which is easy to use and is part of a system which also provides a sturdy and easy to use guide for aligning the ball and socket for interconnection.

SUMMARY OF THE INVENTION

An object of the present invention is to provide a very sturdy tubular steel column in combination with a rigid steel shaft fitting slidably within the tubular column with a pin inserted in mating holes between the shaft and the tubular column and a broad horizontal retaining plate extending from the shaft over the top of the socket attached to the ball as a means of securing the ball within the trailer socket which is easy to use and is part of a system which also provides a second rigid shaft with angled V-shaped walls extending outwardly with one wall on each side of the ball as a sturdy and easy to use guide for aligning the ball and socket for interconnection.

A related object of the present invention is to provide a broad outwardly expanding horizontal retaining plate which retains the socket on the ball through the full range of angular motion of the trailer arm relative to the towing vehicle for greater assurance against slipping not found in the prior patents.

In brief, a heavy gage steel tubular column is rigidly secured to the trailer hitch on the towing vehicle between the ball and the vehicle. The tubular column receives alternately one of a pair of rigid steel shafts which fit slidably within the tubular shaft. A steel pin is inserted through one of a series of holes in the tubular column mating with a hole in the shaft with the shaft at the desired height to secure the shaft in place.

A guide device has a rigid shaft with a pair of angled walls extending outwardly in a V shape with one wall on each side of the ball as a sturdy and easy to use guide for aligning the ball and socket for interconnection. The rigid shaft is inserted in the tubular column and the pin inserted. As the vehicle is backed toward the trailer the V-shaped walls guide the socket over the ball for easy interconnection.

After the socket and ball are interconnected, the pin is removed from the guide device and a rigid shaft from a hold down device is inserted in the tubular column. The shaft is lowered until a broad horizontal retaining plate extending from the shaft is positioned just above the socket and the pin inserted between the shaft and the tubular column to secure the retaining plate and retain the socket in place on the ball.

The retaining plate is preferably a broad outwardly expanding horizontal thick gage steel plate which retains the socket on the ball through the full range of angular motion of the trailer arm relative to the towing vehicle.

An advantage of the present invention is that it secures a trailer socket on a towing vehicle hitch ball regardless any imperfections in the connection between the ball and socket and through a wide range of angles between the trailer and the towing vehicle and through any type of rough travel conditions.

Another advantage of the present invention is that it is easy to use.

An additional advantage of the present invention is that it is relatively simple and inexpensive to fabricate.

One more advantage of the present invention is that it provides a system which enables both securing the socket on the ball and ease of aligning the socket and ball for interconnection.

BRIEF DESCRIPTION OF THE DRAWINGS

These and other details of my invention will be described in connection with the accompanying drawings, which are furnished only by way of illustration and not in limitation of the invention, and in which drawings:

FIG. 7 is a side partial elevational view in partial section of the trailer hitch safety hold down bracket of FIG. 1 having the horizontal retaining plate shaft hanging on a chain from the towing vehicle attaching arm and a V-plate alignment guide for the trailer arm and hitch ball with the shaft of the V-plate alignment guide aligned for insertion in the receiving tube of the bracket;

FIG. 8 is a top plan view of the trailer hitch safety hold down bracket and V-plate alignment guide in place on the towing vehicle with the trailer arm socket interconnected with the hitch ball;

FIG. 9 is a perspective view of the trailer hitch safety hold down bracket and V-plate alignment guide in place on the towing vehicle with the trailer arm socket aligned for interconnection with the hitch ball.

BEST MODE FOR CARRYING OUT THE INVENTION

Figure 1:
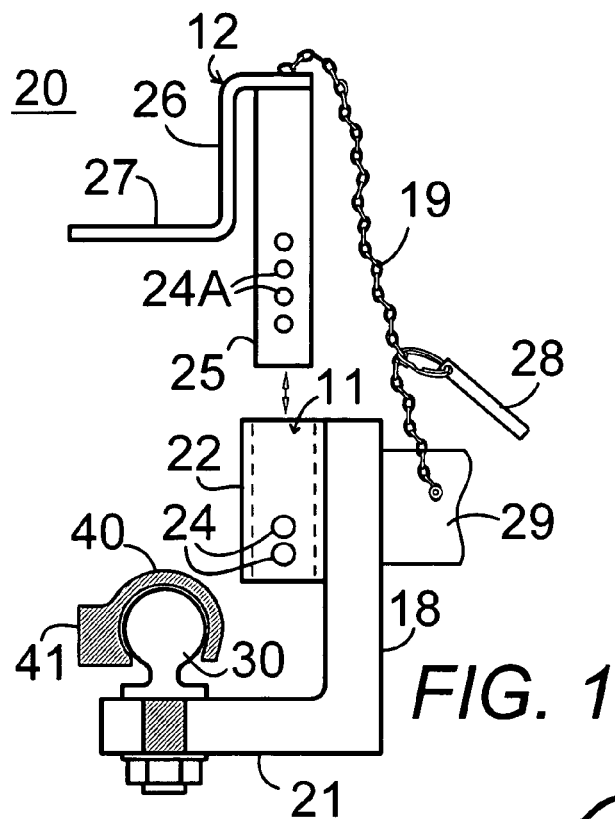
FIG. 1 is a side partial elevational view in partial section of the trailer hitch safety hold down bracket of the present invention having its own ball and attaching arm to the towing vehicle with the horizontal retaining plate shaft aligned for insertion in the receiving tube of the bracket for holding down the trailer socket which is in place on the hitch ball.

In FIGS. 1–9, a trailer hitch safety hold down device 20 and 20A prevents decoupling of a trailer arm socket 40 and a towing vehicle hitch ball 30.

In a stand alone preferred embodiment of the invention of FIGS. 1–4, a mounting base comprises a rigid horizontal support 21 extends rearwardly away from a towing vehicle having a bumper 50 with a trailer hitch ball 30 secured thereon, the trailer hitch ball adapted for receiving a socket 40 thereon from a trailer arm 41. A rigid vertical post 18 is secured to the horizontal support 21. Secured between the mounting base and a towing vehicle having a bumper 50, a rigid horizontal attaching arm 29 is securely attached to the mounting base on the vertical post 18 and extends from the mounting base to a towing vehicle, the attaching arm adapted for attachment to a towing vehicle.

A rigid tubular column 22 is secured to the vertical post 18, preferably by welding, and spaced from the trailer hitch ball 30 between the trailer hitch ball and a towing vehicle. The tubular column 18 has a vertical opening (shown dashed) therethrough and a top opening (arrows) communicating with the vertical opening and at least one pair, and preferably two pair, of mating horizontal openings 24 through the tubular column 18 from a first side to a second side.

Figure 2:
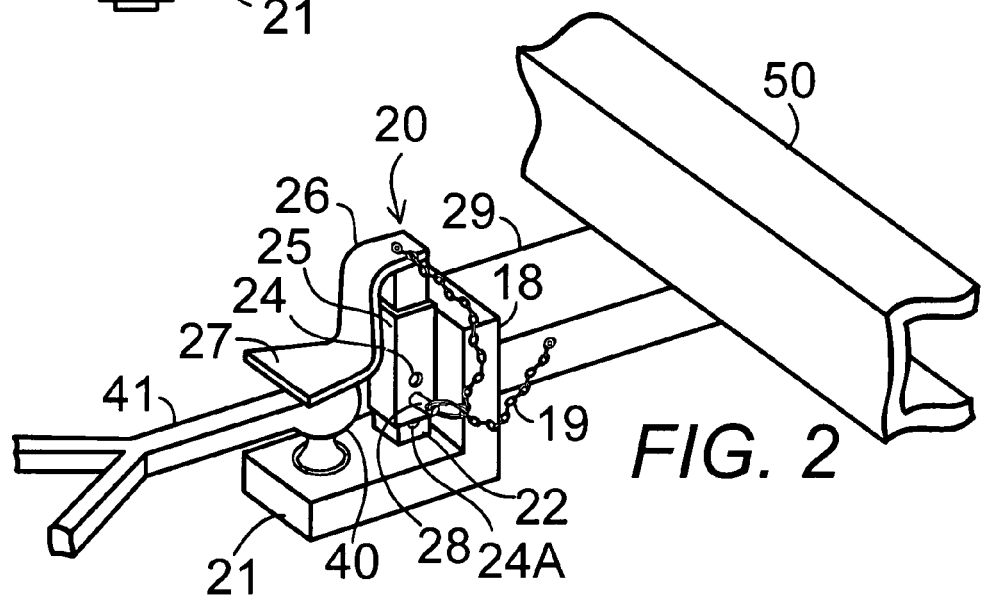
FIG. 2 is a perspective view of the trailer hitch safety hold down bracket of FIG. 1 with the horizontal retaining plate secured over the trailer socket which is in place on the hitch ball.
Figure 3:
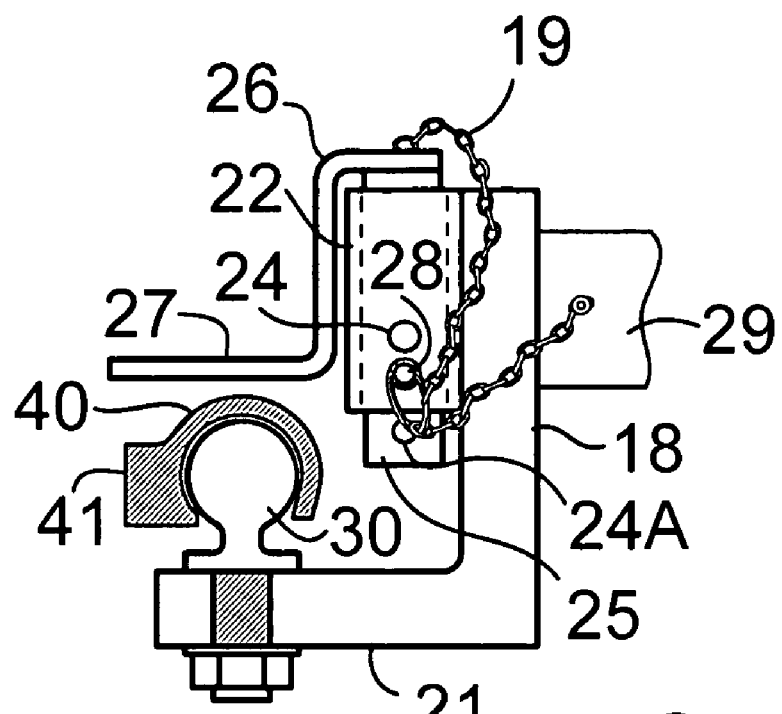
FIG. 3 is a side elevational view in partial section of the trailer hitch safety hold down bracket of FIG. 1 with the horizontal retaining plate secured over the trailer socket which is in place on the hitch ball.
Figure 4:
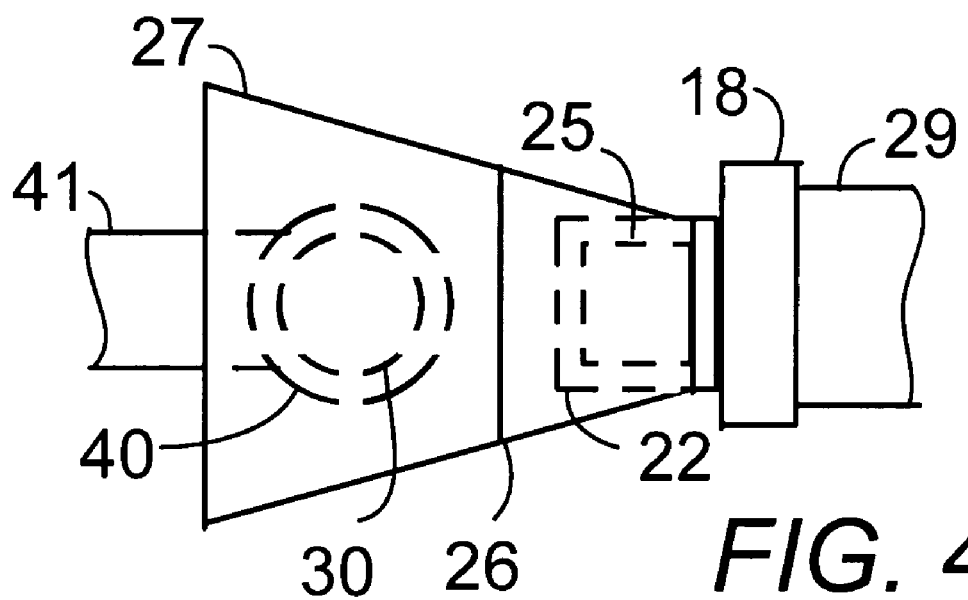
FIG. 4 is a top plan view of the trailer hitch safety hold down bracket of FIG. 1 with the horizontal retaining plate secured over the trailer socket which is in place on the hitch ball.

A hold down bracket 12 having a horizontal retaining plate 27 and a rigid hold down shaft 25 is adapted to fit slidably and removably within the vertical opening of the tubular column 22. The hold down shaft 25 has a series of horizontal openings 24A therethrough spaced apart along its length, the series of horizontal openings adapted for alternately mating with the at least one pair of mating openings 24 of the tubular column 22. The broad rigid horizontal retaining plate 27 extending from the hold down shaft 25 is adapted for positioning just above a trailer arm socket 40 mounted on the trailer hitch ball 30 to prevent a trailer arm socket from separating from the trailer hitch ball, as shown in FIGS. 2–4. The retaining plate 27 is mounted on the hold down shaft 25 by an L-shaped vertical plate 26 extending from the retaining plate 27 over the top of the hold down shaft 25 and secured thereto with the L-shaped vertical plate 26 spaced horizontally apart from the bold down shaft 25 a sufficient distance to permit the hold down shaft to be inserted in the tubular column 22.

The retaining plate 27 preferably comprises a broad outwardly expanding horizontal thick gage steel plate adapted for retaining a trailer arm socket 40 on the trailer hitch ball 30 through a full range of angular motion of a trailer arm 41 relative to the trailer hitch ball 30 because of the broad expanded outer edge of the retaining plate.

A rigid pin 28 is secured to the mounting base on the attaching arm 29 by a flexible means for retaining the pin, such as a metal chain 19, which is preferably also attached to the top of the hold down shaft 25 on the L-shaped vertical plate 26 to insure the hold down bracket and pin stay with the trailer hitch. The pin 28 is adapted for insertion between the tubular column 22 and the hold down shaft 25 through the horizontal openings 24 through the tubular column 22 and one of the series of horizontal openings 24A in the hold down shaft 22 to secure the hold down shaft in place within the tubular column with the retaining plate 27 at a desired height for retaining a trailer arm socket 40 from a trailer arm 41 on the trailer hitch ball 30.

In FIGS. 7–9, a guide device 15 comprises a V-shaped guide 17 and a rigid guide shaft 25A adapted to fit slidably and removably within the vertical opening of the tubular column 22 with the hold down shaft 25 removed therefrom. The guide shaft 25A has a series of horizontal guide shaft openings 24A therethrough spaced apart along its length, the series of horizontal guide shaft openings adapted for alternately mating with the mating openings 24 of the tubular column 22. The V-shaped guide comprises a pair of angled vertical walls 17A and 17B extending outwardly in a V shape from a small connecting wall 17C with one wall on each side of the trailer hitch ball 30 for guiding and aligning the trailer arm socket 40 and trailer hitch ball 30 for interconnection, as best shown in FIGS. 8 and 9.

The vertical opening 11 in the tubular column 22 and the hold down shaft 25 and the guide shaft 25A preferably have mating rectangular cross-sectional configurations to insure that the shafts will not rotate within the tubular column.

In FIGS. 1–4 and 7–9, the trailer hitch safety hold down device 20 is a complete stand alone unit wherein the mounting base with the horizontal support 21 and the vertical post 18 are permanently mounted to the mounting arm 29, preferably by welding, to form a single unit adapted for attaching to a towing vehicle.

Figure 5:
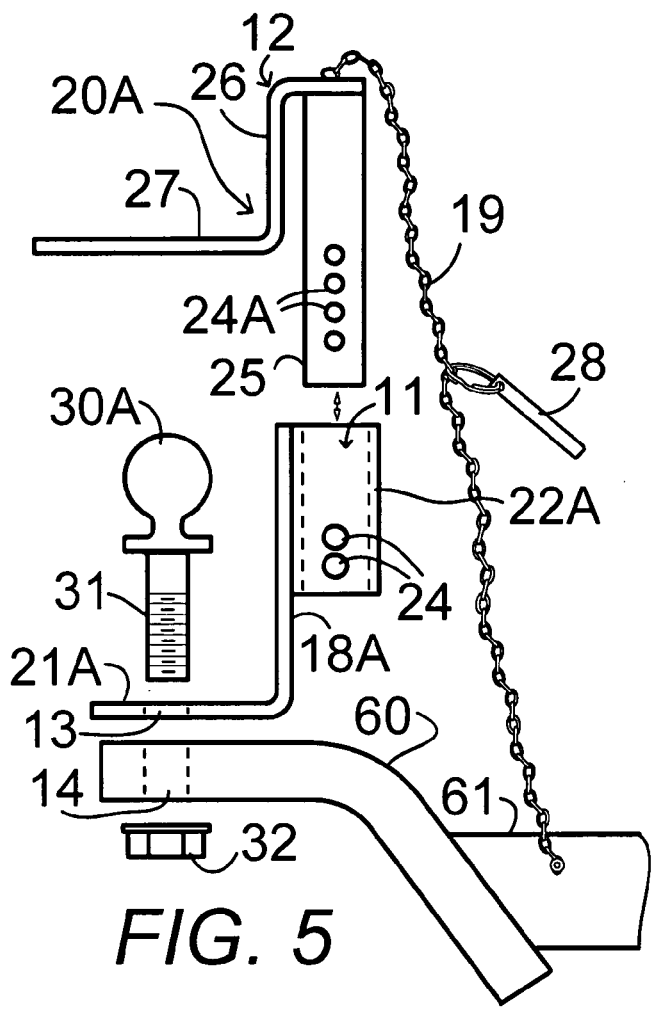
FIG. 5 is a side elevational view of an alternate embodiment of the trailer hitch safety hold down bracket of the present invention aligned for attachment to the ball and attaching arm of the towing vehicle with the horizontal retaining plate shaft aligned for insertion in the receiving tube of the bracket.
Figure 6:
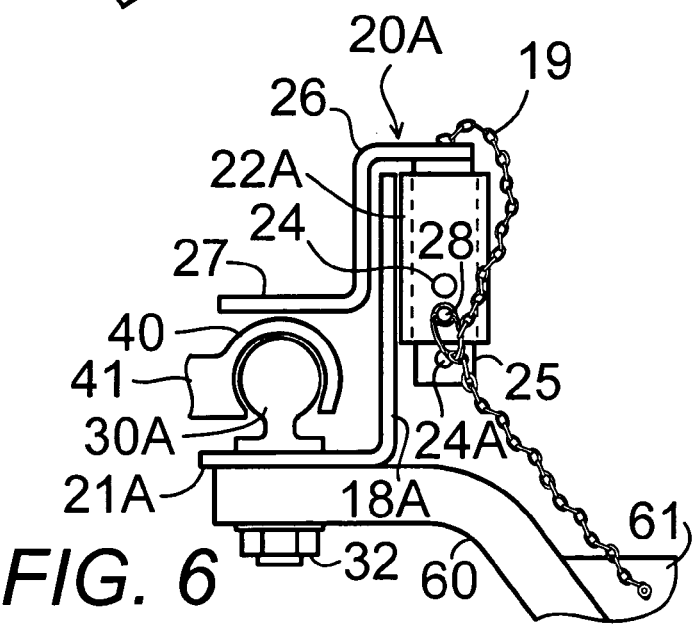
FIG. 6 is a side elevational view of the alternate embodiment of the trailer hitch safety hold down bracket of FIG. 6 with the horizontal retaining plate secured over the trailer socket which is in place on the hitch ball.

In FIGS. 5 and 6, a universally adaptable trailer hitch safety hold down device 20A has the horizontal support 21A and the vertical post 18A formed in an L-shaped unit removably attachable to an existing trailer hitch 60 with the horizontal support 21A bolted between an existing trailer hitch ball 30A having a threaded shaft 31 and bolt 32 and an existing trailer hitch base 60 through holes 13 and 14 in the horizontal support 21A and the existing trailer hitch base 60 attachable to a towing vehicle by an existing attachment arm 61. The tubular column 22A may be mounted on the side of the vertical post 18A away from the trailer hitch ball 30A. The adaptable device 20A has all of the other features the same as the stand alone device 20 including the guide 15.

All of the components are preferably fabricated of thick hardened steel weatherproofed on the exterior to prevent rusting or stainless or other non-corroding steel.

It is understood that the preceding description is given merely by way of illustration and not in limitation of the invention and that various modifications may be made thereto without departing from the spirit of the invention as claimed.

What is claimed is:

1. A trailer hitch safety hold-down device for preventing decoupling of a trailer arm socket and towing vehicle hitch ball, the device comprising:
  a mounting base comprising a rigid horizontal support extending rearwardly away from a towing vehicle, the horizontal support having a trailer hitch ball secured thereon, the trailer hitch ball adapted for receiving a socket thereon from a trailer arm, and a rigid vertical post secured to the horizontal support, and, secured between the mounting base and a towing vehicle, a rigid horizontal attaching arm securely attached to the mounting base and extending from the mounting base to a towing vehicle, the attaching arm adapted for attachment to a towing vehicle;
  a rigid tubular column secured to the vertical post spaced from the trailer hitch ball between the trailer hitch ball and a towing vehicle, the tubular column having a vertical opening therethrough and a top opening communicating with the vertical opening and at least one pair of mating openings through the tubular column from a first side to a second side;
  a hold down bracket having a rigid hold down shaft adapted to fit slidably and removably within the vertical opening of the tubular column, the hold down shaft having a series of horizontal openings therethrough spaced apart along its length, the series of horizontal openings adapted for alternately mating with the at least one pair of mating openings of the tubular column, a broad rigid horizontal retaining plate extending from the hold down shaft is adapted for positioning just above a trailer arm socket mounted on the trailer hitch ball to prevent a trailer arm socket from separating from the trailer hitch ball;
  a rigid pin secured to the mounting base by a flexible means for retaining the pin, the pin adapted for insertion between the tubular column and the hold down shaft through the at least one horizontal opening through the tubular column and one of the series of horizontal openings in the hold down shaft to secure the hold down shaft in place within the tubular column with the retaining plate at a desired height for retaining a trailer arm socket from a trailer arm on the trailer hitch ball.

2. The hold down device of claim 1 wherein the retaining plate comprises a broad outwardly expanding horizontal thick gage steel plate adapted for retaining a trailer arm socket on the trailer hitch ball through a full range of angular motion of a trailer arm relative to the trailer hitch ball.

3. The hold down device of claim 1 wherein the retaining plate is mounted on the hold down shaft by an L-shaped vertical plate extending from the retaining plate over the top of the hold down shaft and secured thereto.

4. The hold down device of claim 1 wherein the hold down bracket is attached to the flexible means for retaining the pin.

5. The hold down device of claim 4 wherein the flexible means for retaining the pin comprises a chain.

6. The hold down device of claim 1 further comprising a guide device comprising a rigid guide shaft adapted to fit slidably and removably within the vertical opening of the tubular column with the hold down shaft removed therefrom, the guide shaft having a series of horizontal guide shaft openings therethrough spaced apart along its length, the series of horizontal guide shaft openings adapted for alternately mating with the at least one pair of mating openings of the tubular column, and a pair of angled vertical walls extending outwardly in a V shape with one wall on each side of the trailer hitch ball for guiding and aligning the trailer arm socket and trailer hitch ball for interconnection.

7. The hold down device of claim 1 wherein the vertical opening in the tubular column and the guide shaft have mating rectangular cross-sectional configurations.

8. The hold down device of claim 1 wherein the mounting base and the mounting arm are permanently secured together in a single unit adapted for attaching to a towing vehicle.

9. The hold down device of claim 1 wherein the horizontal support and the vertical post form an L-shaped unit removably attachable to an existing trailer hitch with the horizontal support bolted between an existing trailer hitch ball and an existing trailer hitch base attachable to a towing vehicle.

10. The hold down device of claim 1 wherein the vertical opening in the tubular column and the hold down shaft have mating rectangular cross-sectional configurations.

* * * * *